United States Patent
Hughes (10) Patent No.: US 6,665,788 B1
(45) Date of Patent: Dec. 16, 2003

(54) REDUCING LATENCY FOR A RELOCATION CACHE LOOKUP AND ADDRESS MAPPING IN A DISTRIBUTED MEMORY SYSTEM

(75) Inventor: William Alexander Hughes, Burlingame, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 98 days.

(21) Appl. No.: 09/905,448

(22) Filed: Jul. 13, 2001

(51) Int. Cl.[7] ............................................. G06F 12/00
(52) U.S. Cl. ..................... 711/206; 711/202; 711/203; 711/207; 345/566; 345/568
(58) Field of Search .................. 711/202–203, 206–207, 711/3, 145, 126, 139; 345/566, 568

(56) References Cited

U.S. PATENT DOCUMENTS

| | | | |
|---|---|---|---|
| 4,669,043 A | 5/1987 | Kaplinsky ..................... 711/3 |
| 4,700,291 A | 10/1987 | Saito ........................... 711/207 |
| 5,060,137 A | 10/1991 | Bryg et al. .................. 711/205 |
| 5,586,283 A | * 12/1996 | Lopez-Aguado et al. ... 711/207 |
| 5,623,619 A | 4/1997 | Witt .............................. 711/3 |
| 5,666,509 A | * 9/1997 | McCarthy et al. .......... 711/206 |
| 5,671,444 A | 9/1997 | Akkary et al. ............... 710/52 |
| 5,680,566 A | * 10/1997 | Peng et al. .................. 711/206 |
| 5,680,572 A | 10/1997 | Akkary et al. .............. 711/126 |
| 5,696,925 A | * 12/1997 | Koh ............................ 711/203 |
| 5,751,996 A | 5/1998 | Glew et al. .................. 711/145 |
| 5,752,274 A | 5/1998 | Garibay, Jr. et al. ......... 711/206 |
| 5,761,691 A | 6/1998 | Witt .............................. 711/3 |
| 5,895,501 A | 4/1999 | Smith ........................... 711/207 |
| 5,913,923 A | * 6/1999 | Dunlap et al. ............... 711/109 |
| 5,924,125 A | 7/1999 | Arya ........................... 711/205 |
| 5,960,463 A | * 9/1999 | Sharma et al. .............. 711/206 |
| 6,189,074 B1 | 2/2001 | Pedneau ....................... 711/139 |
| 6,304,944 B1 | 10/2001 | Pedneau ....................... 600/595 |

FOREIGN PATENT DOCUMENTS

GB   2210479   6/1989

OTHER PUBLICATIONS

*Computer Architecture: A Quantitative Approach,* Patter and Hennessy, Morgan Kaufmann Publisher, Inc., 1990, pp. 437–438.
*Pentium Pro Family Developer's Manual, vol. 3: Operating System Writer's Guide,* Intel, 1995, pp. 11–13 to 11–26.
*AGP Memory Mapping: Accelerated Graphics Port Technology,* Chapter 4, Intel, Apr. 6, 2001, 1 page.
*Accelerated Graphics Port Interface Specification,* Intel, May 4, 1998, pp. 23–29.

* cited by examiner

Primary Examiner—Mano Padmanabhan
Assistant Examiner—Mehdi Namazi
(74) Attorney, Agent, or Firm—Lawrence J. Merkel; Meyertons, Hood, Kivlin, Kowert & Goetzel, P.C.

(57) ABSTRACT

An address relocation cache includes a plurality of entries. Each of the plurality of entries is configured to store at least a portion of an input address, at least a portion of an output address to which the input address translates, and a destination identifier corresponding to the output address. An input address may be translated to the output address and the corresponding destination identifier may be obtained concurrently for input addresses which hit in the address relocation cache. If an input address misses in the address relocation cache, a translation corresponding to the address may be located for storing into the address relocation cache. The output address indicated by the translation may be passed through the address map to obtain the destination identifier, and the destination identifier may be stored in the address relocation cache along with the output address.

29 Claims, 7 Drawing Sheets

REDUCING LATENCY FOR A RELOCATION CACHE LOOKUP AND ADDRESS MAPPING IN A DISTRIBUTED MEMORY SYSTEM

BACKGROUND OF THE INVENTION

1. Field of the Invention

This invention is related to the field of computer systems and, more particularly, to address relocation/translation and address mapping in distributed memory computer systems.

2. Description of the Related Art

In distributed memory computer systems, system memory is divided into two or more portions, each of which is located within the system at a different point than the other portions. For example, the computer system may be arranged into nodes, some of which may be coupled to portions of the system memory. Similarly, systems may support the connection of peripheral devices (also referred to as input/output (I/O) devices) at different points in the system (e.g. to different nodes). Accordingly, an address map is typically included in nodes. The address map stores indications of address ranges and a destination identifier for each address range which indicates the destination within the system for a transaction having an address within that address range. Thus, the address map can be accessed to determine the destination of a transaction having a particular address.

Additionally, however, some nodes (or some transactions generated within a node) may require translation of a generated address to another address prior to accessing memory (and thus prior to accessing the address map). For example, the Graphics Aperture Relocation Table (GART) is used in personal computer systems to translate physical addresses within a memory region to different physical addresses. The GART can be used to allow a graphics device to address a large, contiguous address space while still allowing the operating system to freely map the pages within the contiguous address space (e.g. to non-contiguous addresses). Other types of translations exist as well (e.g. central processing units (CPUs) typically translate virtual addresses generated by executing program code).

Unfortunately, translating a first address to a second (physical) address and mapping that address to a destination identifier in the address map is a serial process. The latency of the procedure is approximately the sum of the latency of the translation and the latency of the address mapping. Additionally, in some cases the translation is either required or not required based on the source of the address (or the address itself). Thus, transactions which have no need to pass through the translation hardware may still be delayed by the latency of the translation hardware (or complicated bypass circuitry may be included to reduce the latency).

SUMMARY OF THE INVENTION

An address relocation cache includes a plurality of entries. Each of the plurality of entries is configured to store at least a portion of an input address, at least a portion of an output address to which the input address translates, and a destination identifier corresponding to the output address. An input address may be translated to the output address and the corresponding destination identifier may be obtained concurrently for input addresses which hit in the address relocation cache. The latency for performing the translation and the address mapping may be reduced. If an input address misses in the address relocation cache, a translation corresponding to the address may be located for storing into the address relocation cache. The output address indicated by the translation may be passed through the address map to obtain the destination identifier, and the destination identifier may be stored in the address relocation cache along with the output address.

In one embodiment, addresses are translated for only a portion of a memory range. In such an embodiment, the address map may be accessed with the input address to the address relocation cache in parallel with accessing the address relocation cache. If the input address is outside the memory region for which translation is performed, the input address and the destination identifier output from the address map in response to the input address may be used.

Broadly speaking, an apparatus is contemplated, comprising a memory. The memory includes a plurality of entries. Each of the plurality of entries is configured to store: (i) at least a portion of an input address and at least a portion of a corresponding output address to which the input address translates; and (ii) a destination identifier indicative of a destination corresponding to the output address.

Additionally, a method is contemplated. At least a portion of an input address is received in a memory. The memory outputs at least a portion of an output address. The output address is a translation of the input address. A first destination identifier is also output from the memory. The first destination identifier is indicative of a destination corresponding to the output address.

Furthermore, an apparatus is contemplated, comprising a table walk circuit, an address map coupled to the table walk circuit, and a memory coupled to the table walk circuit. The table walk circuit is configured to locate a translation of an input address to an output address. The table walk circuit is configured to provide the output address to the address map, which is configured to output a destination identifier in response thereto. The destination identifier is indicative of a destination corresponding to the output address. The memory is configured to store at least a portion of the input address, at least a portion of the output address, and the destination identifier.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

System Overview

Figure 1:
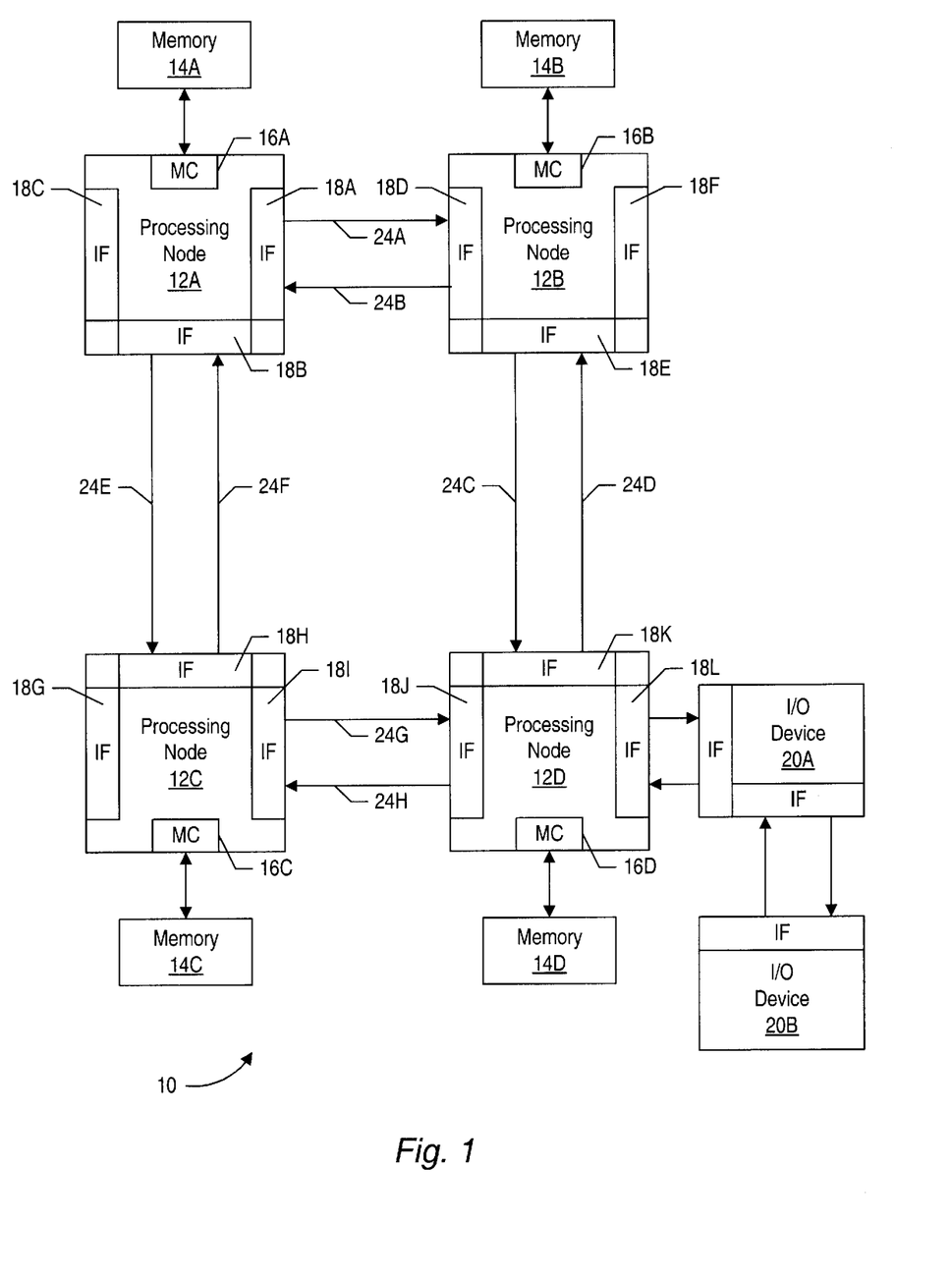
FIG. 1 is a block diagram of one embodiment of a computer system.

Turning now to FIG. 1, one embodiment of a computer system 10 is shown. Other embodiments are possible and contemplated. In the embodiment of FIG. 1, the computer system 10 includes several processing nodes 12A, 12B, 12C, and 12D. Each processing node is coupled to a respective memory 14A–14D via a memory controller 16A–16D included within each respective processing node 12A–12D. Additionally, the processing nodes 12A–12D include interface logic used to communicate between the processing nodes 12A–12D. For example, the processing node 12A includes interface logic 18A for communicating with the processing node 12B, interface logic 18B for communicating with the processing node 12C, and a third interface logic 18C for communicating with yet another processing node (not shown). Similarly, the processing node 12B includes interface logic 18D, 18E, and 18F; the processing node 12C includes interface logic 18G, 18H, and 18I; and the processing node 12D includes interface logic 18J, 18K, and 18L. Processing node 12D is coupled to communicate with an input/output (I/O) device 20A via interface logic 18L, and the I/O device 20A is further coupled to a second I/O device 20B. Other processing nodes may communicate with other I/O devices in a similar fashion. Alternatively, a processing node may communicate with an I/O bridge which is coupled to an I/O bus.

The processing nodes 12A–12D implement a packet-based link for inter-processing node communication. In the present embodiment, the link is implemented as sets of unidirectional lines (e.g. the lines 24A are used to transmit packets from the processing node 12A to the processing node 12B and the lines 24B are used to transmit packets from the processing node 12B to the processing node 12A). Other sets of lines 24C–24H are used to transmit packets between other processing nodes as illustrated in FIG. 1. The link may be operated in a cache coherent fashion for communication between processing nodes or in a noncoherent fashion as a daisy-chain structure between the I/O devices 20A–20B (and additional I/O devices, as desired). It is noted that a packet to be transmitted from one processing node to another may pass through one or more intermediate nodes. For example, a packet transmitted by the processing node 12A to the processing node 12D may pass through either the processing node 12B or the processing node 12C as shown in FIG. 1. Any suitable routing algorithm may be used. Other embodiments of the computer system 10 may include more or fewer processing nodes then the embodiment shown in FIG. 1.

The processing nodes 12A–12D, in addition to a memory controller and interface logic, may include one or more processors. Broadly speaking, a processing node comprises at least one processor and may optionally include a memory controller for communicating with a memory and other logic as desired. As used herein, a "node" is a device which is capable of participating in transactions upon the interconnect.

The memories 14A–14D may comprise any suitable memory devices. For example, a memory 14A–14D may comprise one or more RAMBUS DRAMs (RDRAMs), synchronous DRAMs (SDRAMs), DRAM, static RAM, etc. The address space of the computer system 10 is divided among the memories 14A–14D. Each processing node 12A–12D may include a memory map used to determine which addresses are mapped to which memories 14A–14D, and hence to which processing node 12A–12D a memory request for a particular address should be routed. In one embodiment, the coherency point for an address within the computer system 10 is the memory controller 16A–16D coupled to the memory storing bytes corresponding to the address. The memory controllers 16A–16D may comprise control circuitry for interfacing to the memories 14A–14D. Additionally, the memory controllers 16A–16D may include request queues for queuing memory requests.

Generally, the interface logic 18A–18L may comprise buffers for receiving packets from the link and for buffering packets to be transmitted upon the link. The computer system 10 may employ any suitable flow control mechanism for transmitting packets. For example, in one embodiment, each node stores a count of the number of each type of buffer within the receiver at the other end of the link to which each interface logic is connected. The node does not transmit a packet unless the receiving node has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

The I/O devices 20A–20B are illustrative of any desired peripheral devices. For example, the I/O devices 20A–20B may comprise network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Generally, one or more packets may comprise a transaction. A transaction may be used to communicate between two nodes (or within devices within a node). Read transactions may be a transfer of data from the target of the transaction to the initiator of the transaction. Write transactions may be a transfer of data from the initiator to the target. Other types of transactions may be used to pass messages between nodes, to configure the nodes (e.g. at boot), etc.

Node

Figure 2:
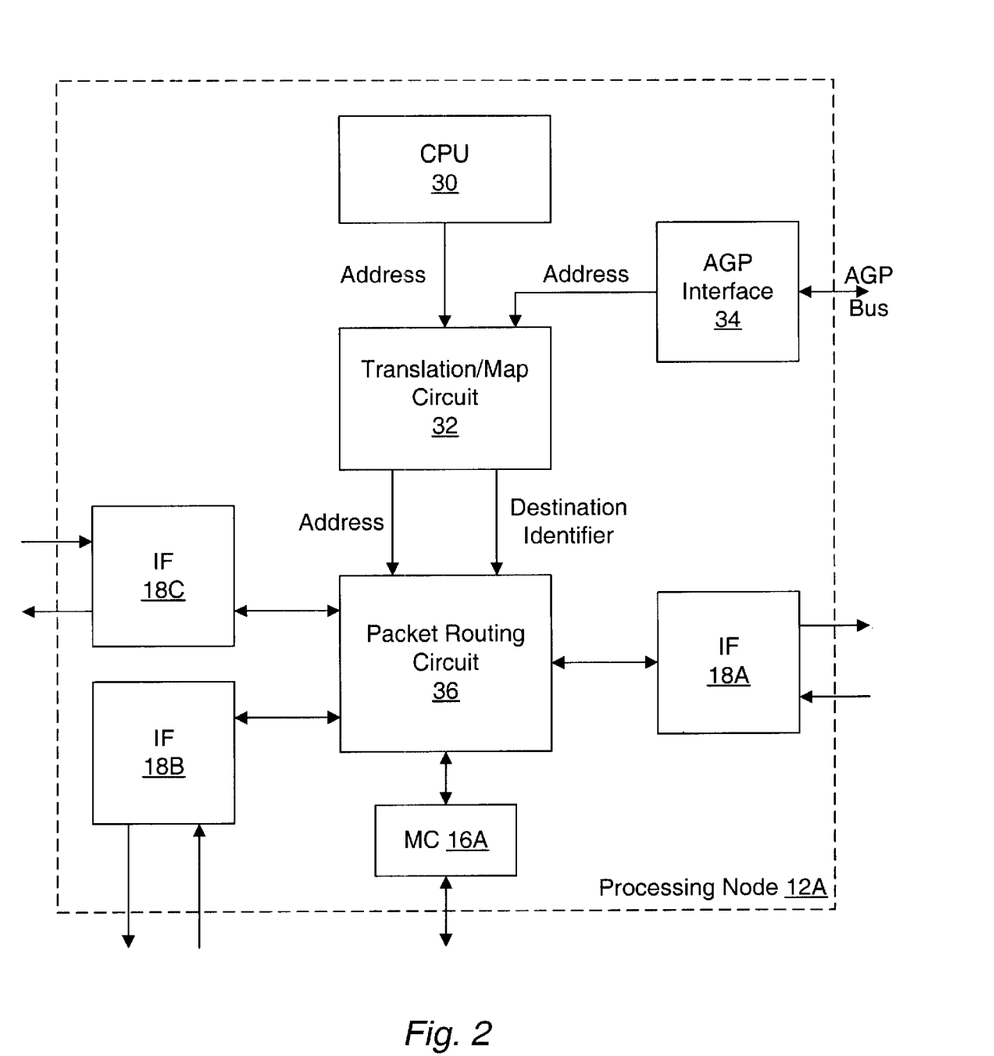
FIG. 2 is a block diagram of one embodiment of a processing node shown in FIG. 1.

Turning now to FIG. 2, a block diagram of one embodiment of a processing node 12A is shown. Other processing nodes may be configured similarly. Other embodiments are possible and contemplated. In the embodiment of FIG. 2, the processing node 12A includes a CPU 30, an translation/map circuit 32, an advanced graphics port (AGP) interface 34, a packet routing circuit 36, the memory controller 16A, and the interfaces 18A–18C. The CPU 30 and the AGP interface 34 are coupled to the translation/map circuit 32, which is further coupled to the packet routing circuit 36. The packet routing circuit 36 is coupled to the interfaces 18A–18C (each of which may be coupled to respective unidirectional links in the present embodiment, as illustrated in FIG. 1) and the memory controller 16A (which may be coupled to the memory 14A as shown in FIG. 1). The packet routing circuit 36 may also be coupled to the AGP interface 34 and the CPU 30 for routing of packets destined for those elements, as desired. The AGP interface 34 may be coupled to an AGP bus for communicating with an AGP device.

Generally, the CPU 30 and the AGP interface 34 may generate transactions. The CPU 30 may generate transactions in response to instructions executing thereon, and the AGP interface 34 may generate transactions in response to activity on the AGP bus. The translation/map circuit 32 may translate the address from the CPU 30/AGP interface 34, and may generate a destination identifier which identifies the destination of the transaction. The destination identifier may include a variety of information, depending on the embodiment. An exemplary destination identifier is illustrated below in FIG. 6. The (possibly translated) address and the destination identifier are provided to the packet routing circuit 36. Using the destination identifier, the packet routing circuit 36 may create a packet for the transaction and transmit the packet on one or more of the interfaces 18A–18C responsive to the destination identifier. Furthermore, if the destination identifier indicates that the processing node 12A is the destination of the transaction, then the packet routing circuit 36 may route the packet to the memory controller 16A (or a host bridge to an I/O device, if the address is an I/O address).

Figure 3:
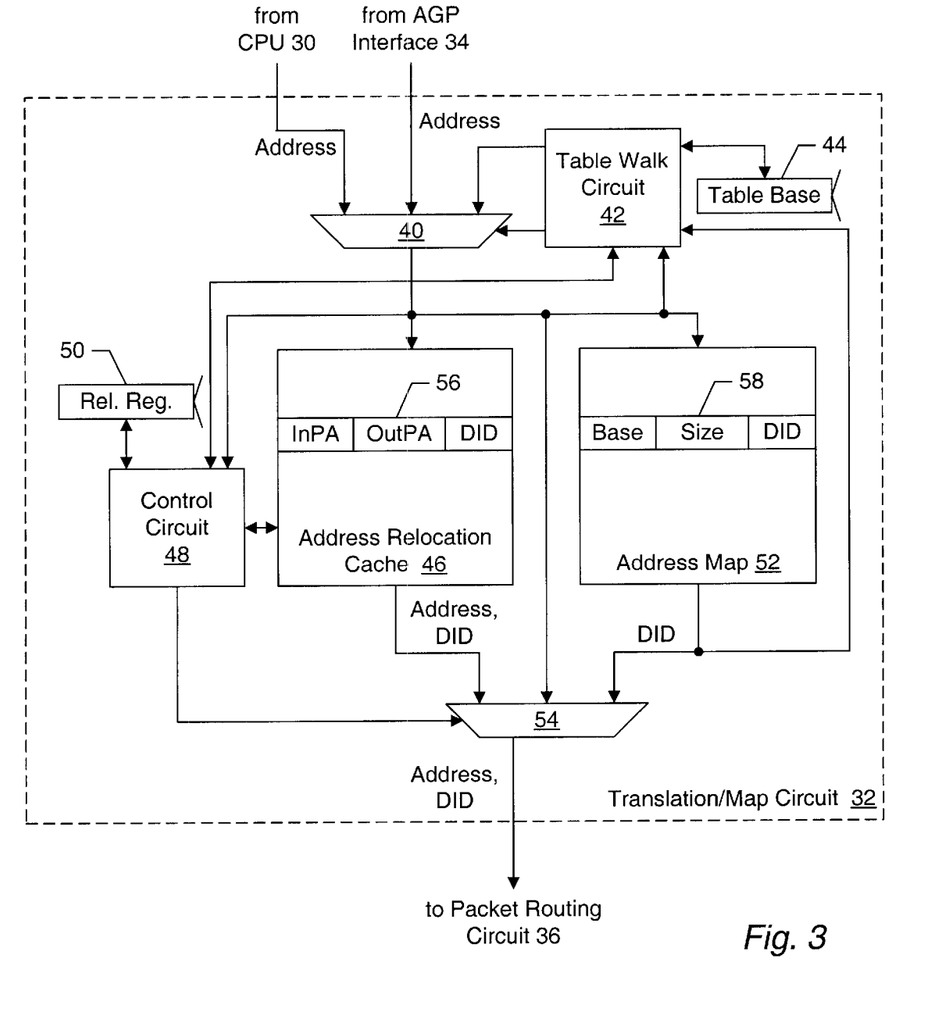
FIG. 3 is a block diagram of one embodiment of an translation/map circuit shown in FIG. 2.

In one implementation, the translation/map circuit 32 may include both an address relocation cache and an address map. An exemplary implementation is shown in FIG. 3 below. The address map may include an indication of one or more address ranges and, for each range, a destination identifier identifying the destination for addresses within that range. The address relocation cache may store input addresses and corresponding output addresses, where a given output address is the result of translating a given input address through an address translation mechanism (e.g. the GART, a virtual to physical address translation, etc.). Additionally, the address relocation cache may store the destination identifier corresponding to the output address. Particularly, the destination identifier may be stored into a given entry of the address relocation cache when the input address and corresponding output address are stored in the entry. In this manner, the formerly serial nature of the address translation and the mapping of the translated address to the destination identifier may be performed in a more parallel fashion for addresses that hit in the address relocation cache. The latency of initiating a transaction may be shortened by obtaining the translation and the destination identifier concurrently. Instead, the latency may be experienced when a translation is loaded into the address relocation cache.

In one embodiment, the input address (e.g. from either the CPU 30 or the AGP interface 34) may be presented to the address map in parallel with the address relocation cache. In this manner, if the input address is not within a memory region for which addresses are translated, the address map output may be used as the destination identifier. Thus, a destination identifier may be obtained in either case.

As used herein, the term "destination identifier" refers to one or more values which indicate the destination of a transaction having a particular address. The destination may be the device (e.g. memory controller, I/O device, etc.) addressed by the particular address, or a device which communicates with the destination device. Any suitable indication or indications may be used for the destination identifier. For example, in a distributed memory system such as the one shown in FIG. 1, the destination identifier may comprise a node number indicating which node is the destination of the transaction. Other embodiments may identify destinations in other fashions. For example, the transmission control protocol/Internet protocol (TCP/IP) defines destinations using Internet addresses. A system could include multiple nodes (e.g., computer systems), each having an assigned Internet address and a portion of an address space assigned thereto. The destination identifier could be the Internet address. In a system in which different devices are inserted into different connectors, a connector number identifying the connector could be used.

Figure 6:
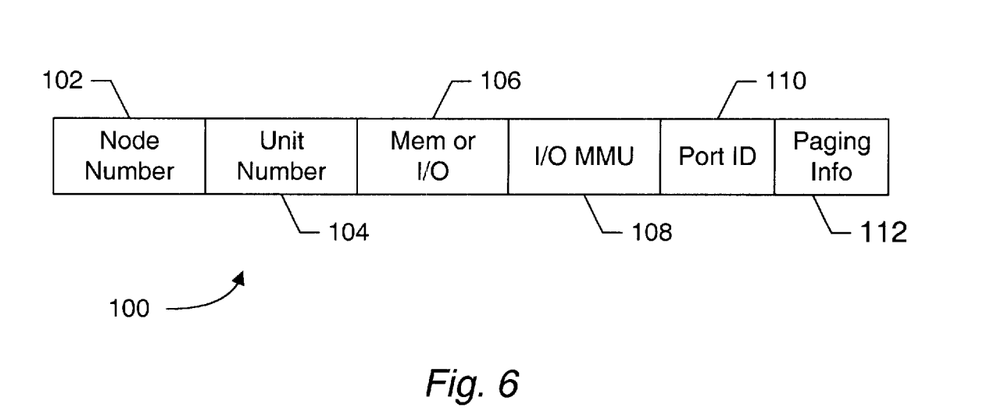
FIG. 6 is a block diagram of one embodiment of a destination identifier.

In addition to identifying the destination, some embodiments may include additional information. An example is provided below (FIG. 6).

The packet routing circuit 36 may be further configured to receive packets from the interfaces 18A–18C and the memory controller 16A and to route these packets onto another interface 18A–18C or to the CPU 30 or the AGP interface 34, depending on destination information in the packet. For example, packets may include a destination node field which identifies the destination node, and may further include a destination unit field identifying a particular device within the destination node. The destination node field may be used to route the packet to another interface 18A–18C if the destination node is a node other than the processing node 12A. If the destination node field indicates the processing node 12A is the destination, the packet routing circuit 36 may use the destination unit field to identify the device within the node (e.g. the CPU 30, the AGP interface 34, the memory controller 16A, and any other devices which may be included in the processing node 12A) to which the packet is to be routed.

The CPU 30 may be any type of processor (e.g. an x86-compatible processor, a MIPS compatible processor, a SPARC compatible processor, a Power PC compatible processor, etc.). Generally, the CPU 30 includes circuitry for executing instructions defined in the processor architecture implemented by the CPU 30. The CPU 30 may be pipelined, superpipelined, or non-pipelined, and may be scalar or superscalar, as desired. The CPU 30 may implement in-order dispatch/execution or out of order dispatch/execution, as desired.

The AGP interface 34 may generally include circuitry for interfacing to an AGP device on the AGP bus. Generally, the AGP bus is a bus for communicating to a graphics device. Any bus may be used in various embodiments.

It is noted that, while the CPU 30 and the AGP interface 34 are shown as sources of addresses for transactions in the embodiment of FIG. 2, other embodiments may include only one of the CPU 30 and the AGP interface 34 as a source of an address. Furthermore, other embodiments may include multiple instantiations of either or both of the CPU 30 and the AGP interface 34. Furthermore, other embodiments may include any additional or substitute sources of addresses for transactions, as desired. For example, a Peripheral Component Interconnect (PCI) interface could be used as a source of an address. It is noted that nodes which do not include a CPU may be referred to with the term "node" rather than "processing node". It is further noted that the AGP interface 34 may be coupled to an interface 18A–18C as an I/O device similar to I/O devices 20A–20B as shown in FIG. 1.

Turning now to FIG. 3, a block diagram of one embodiment of the translation/map circuit 32 is shown. Other embodiments are possible and contemplated. In the embodiment of FIG. 3, the translation/map circuit 32 includes an input multiplexor (mux) 40, a table walk circuit 42, a table base register 44, an address relocation cache 46, a control circuit 48, a relocation region register 50, an address map 52, and an output mux 54. The input mux 40 is coupled to receive the addresses of transactions from the CPU 30 and the AGP interface 34, and is further coupled to receive an address and a selection control from the table walk circuit 42. The output of mux 40 is an input address to the address relocation cache 46, the control circuit 48, the address map 52, the output mux 54, and the table walk circuit 42. The table walk circuit 42 is further coupled to the table base register 44 and to receive the destination identifier (DID in FIG. 3) from the address map 52. The table walk circuit 42 is further coupled to the control circuit 48, which is coupled to the relocation region register 50, the output mux 54, and the address relocation cache 46. The address relocation cache 46 and the address map 52 are further coupled to the output mux 54.

Generally, the address relocation cache 46 receives the input address and outputs a corresponding output address and destination identifier (if the input address is a hit in the address relocation cache 46). The output address is the address to which the input address translates according to the translations in a set of translation tables defined by the translation mechanism. For example, the translation mechanism may be the GART translation mechanism. The GART translates one physical address (within the graphics aperture defined by the value in the relocation region register 50) to another physical address. Thus, the input address and output address are both physical addresses in this embodiment (InPA and OutPA in the address relocation cache 46). The format and content of the page tables for the GART may be implementation dependent, but generally includes the information, in one or more entries of the page tables, to translate the input address to the output address. The destination identifier is the destination identifier from the address map 52 which corresponds to the output address.

The address relocation cache 46 is generally a memory comprising a plurality of entries used to cache recently used translations. An exemplary entry 56 is illustrated in FIG. 3. The entry 56 may include the input address (InPA), the corresponding output address (OutPA), and the destination identifier (DID) corresponding to the output address. Other information, such as a valid bit indicating that the entry 56 is storing valid information, may be included as desired. The number of entries in the address relocation cache 46 may be varied according to design choice. The address relocation cache 46 may have any suitable organization (e.g. direct-mapped, set associative, or fully associative). Furthermore, any suitable memory may be used. For example, the address relocation cache 46 may be implemented as a set of registers. Alternatively, the address relocation cache 46 may be implemented as a random access memory (RAM). In yet another alternative, the address relocation cache 46 may be implemented as a content address memory (CAM), with the comparing portion of the CAM being the input address field. Circuitry for determining a hit or miss and selecting the hitting entry may be within the address relocation cache 46 (e.g. the CAM or a cache with comparators to compare one or more input addresses from indexed entries to the input address received by the cache) or control circuit 48 as desired, and the address relocation cache 46 may be configured to output the output address and the destination identifier from the hitting entry. Generally, an input address is a hit in an entry if the portion of the input address stored in the entry (up to all of the input address, depending on the embodiment) and a corresponding portion of the received input address match.

Each of the entries 56 may correspond to one translation in the translation tables. Generally, the translation tables may provide translations on a page basis. For example, 4 kilobyte pages may be typical, although 8 kilobytes has been used as well as larger pages such as 1, 2, or 4 Megabytes. Any page size may be used in various embodiments. Accordingly, some of the address bits are not translated (e.g. those which define the offset within the page). Instead, these bits pass through from the input address to the output address unmodified. Accordingly, such bits may not be stored for either the input address or the output address in a given entry 56. Generally, an entry 56 may store at least a portion of an input address. The portion may exclude the untranslated portion of the input address. Additionally, in embodiments in which one or more entries 56 are selected via an index portion of the address (e.g. direct-mapped and set associative embodiments), the index portion of the address may be excluded. Similarly, an entry 56 may store at least a portion of an output address. The portion may exclude the untranslated portion of the output address. For simplicity and brevity herein, input address and output address will be referred to. However, it is understood that only the portion of either address needed by the receiving circuitry may be used. It is noted that the portion of the input address provided to the address relocation cache 46, the address map 52, and the control circuit 48 may differ in size (e.g. the address relocation cache 46 may receive the portion excluding the page offset, the address map 52 may receive the portion which excludes the offset within the minimum-sized region for a destination identifier, etc.).

In the present embodiment, translation is provided for a memory region (a range of input addresses) and is not provided outside of the memory region. Accordingly, the address map 52 may receive the input address in parallel with the address relocation cache 46. The address map 52 may output the destination identifier corresponding to the input address. Generally, the address map 52 may include multiple entries (e.g. an exemplary entry 58 illustrated in FIG. 3). Each entry may store a base address of a range of addresses and a size of the range, as well as the destination identifier corresponding to that range. The address map 52 may include circuitry to determine which range includes the input address, to select the corresponding destination identifier for output. The address map 52 may include any type of memory, including register, RAM, or CAM. While the illustrated embodiment uses a base address and size to delimit various ranges, any method of identifying a range may be used (e.g. base and limit addresses, etc.).

The control circuit 48 may receive the input address and may determine whether or not the input address is in the memory region (as defined by the relocation region register 50). If the address is in the memory region and is a hit in the address relocation cache 46, the control circuit 48 may select the output of the address relocation cache 46 through the output mux 54 as the output address and destination identifier from the translation/map circuit 32. If the address is in the memory region but is a miss in the address relocation cache 46, the control circuit 48 may signal the table walk circuit 42 to read the page tables and locate the translation for the input address. If the address is outside of the memory region, the control circuit 48 may select the input address and the destination identifier corresponding to the input address (from the address map 52) through the output mux 54 as the output address and destination identifier from the translation/map circuit 32. Additional details of the operation of the control circuit 48 are provided in the flowchart described in FIG. 4 below.

As mentioned above, the translation tables may vary in form and content from embodiment to embodiment. Generally, the table walk circuit 42 is configured to read the translation tables implemented in a given embodiment to locate the translation for an input address which misses in the address relocation cache. The translation tables may be stored in memory (e.g. a memory region beginning at the address indicated in the table base register 44) and thus may be mapped by the address map 52 to a destination identifier. The table walk circuit 42 may generate addresses within the translation tables to locate the translation and may supply those addresses through the input mux 40 to be mapped through address map 52. The table walk circuit 42 is thus coupled to receive the destination identifier from the address map 52. Additional details regarding one embodiment of the table walk circuit 42 are provided below with respect to FIG. 5. If the table walk circuit 42 is not in the midst of a table walk, the table walk circuit 42 may be configured to allow the addresses from the CPU 30 and the AGP interface 34 to be selected through the input mux 40. Additional control signals (not shown) may be used to select between the address from the CPU 30 and the AGP interface 34 (e.g. round robin selection if both are valid, or selecting the only valid address if one is not valid).

Once the table walk circuit 42 locates the translation, the table walk circuit 42 may supply the output address corresponding to the input address though the input mux 40 in order to obtain the destination identifier corresponding to the output address. The destination identifier, the output address, and the input address may be written into the address relocation cache 46.

While the table walk circuit 42 is shown as a hardware circuit for performing the table walk in FIG. 3, in other embodiments the table walk may be performed in software executed on the CPU 30 or another processor. Similarly, the table walk may be performed via a microcode routine in the CPU 30 or another processor.

It is noted that, while the input mux 40 is provided in the illustrated embodiment to select among several address sources, other embodiments may provide multi-ported address relocation caches and address maps to concurrently service more than one address, if desired.

It is noted that, while the GART translation is used as an example above, any translation mechanism may be used. For example, the CPU's virtual to physical address translation mechanism may be used. In such an embodiment, an translation/map circuit similar to the one shown in FIG. 3 may be included in the CPU 30. The address relocation cache may be referred to as a translation lookaside buffer (TLB) in such an embodiment. Generally speaking, the term "translation" may refer to mapping an input address to an output address through a set of one or more translation tables. The translation tables may typically be managed by software (e.g. the operating system) and may generally be stored in memory. The input address may be a virtual address or a physical address, and the output address is typically a physical address. The terms translation and relocation (or address translation and address relocation) may be used synonymously herein. It is further noted that, while translation is performed for addresses within a memory region in the illustrated embodiment, other embodiments may perform translation for the entire address range. In such an embodiment, the address map 42 may not be accessed in parallel with the address relocation cache 46. Instead, the address map 42 may be accessed during the table walk and the destination identifier corresponding to the output address may be stored in the address relocation cache 46 as described above.

Figure 4:
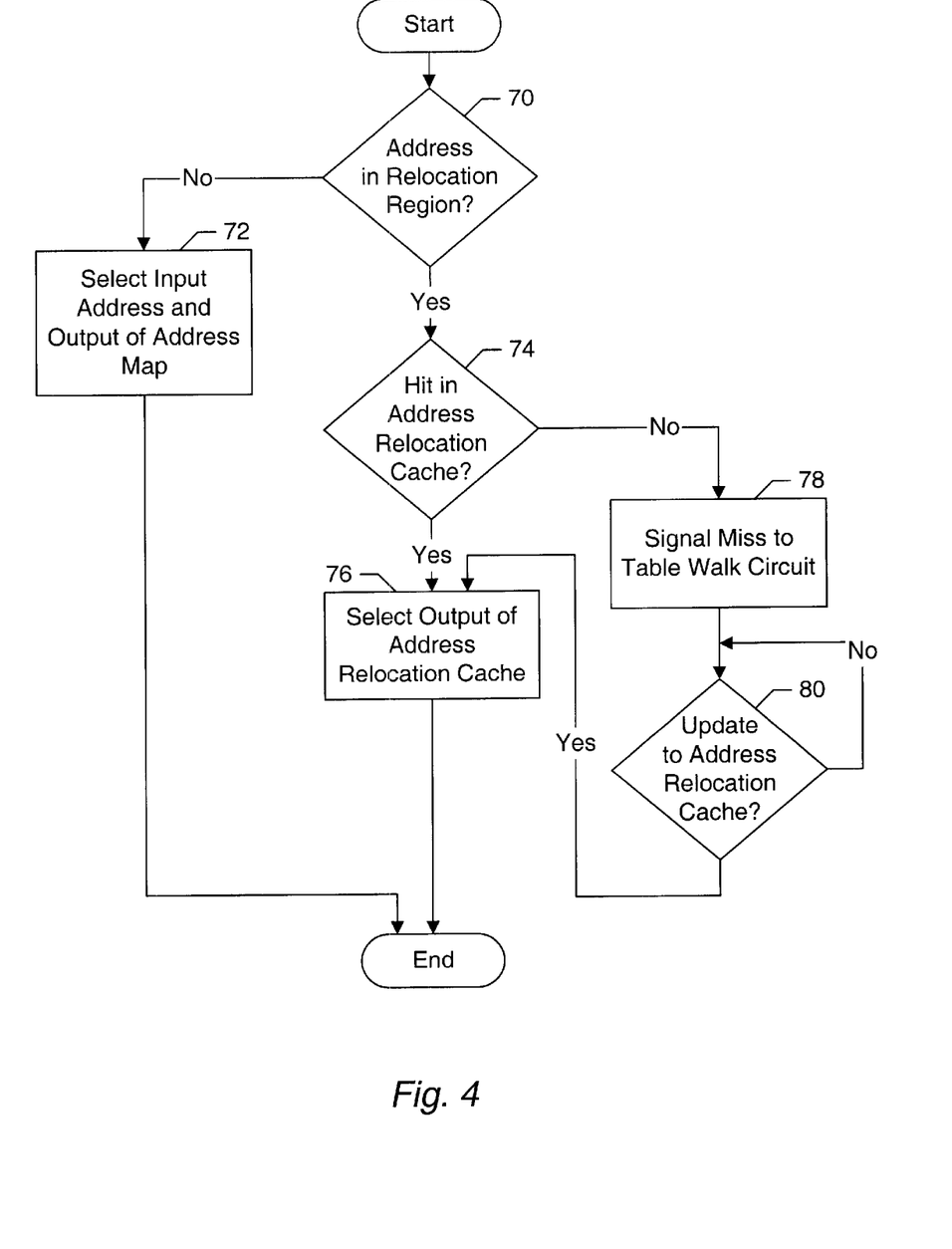
FIG. 4 is a flowchart illustrating operation of one embodiment of a control circuit shown in FIG. 3.

Turning now to FIG. 4, a flowchart is shown illustrating operation of one embodiment of the control circuit 48. Other embodiments are possible and contemplated. While the blocks shown in FIG. 4 are illustrated in a particular order for ease of understanding, any suitable order may be used. Furthermore, the blocks may be implemented in parallel in combinatorial logic circuitry within the control circuit 48. Still further, various blocks may occur in different clock cycles or the same clock cycle, as desired.

The control circuit 48 determines if the input address is in the relocation region indicated by the relocation region register 50 (decision block 70). The relocation register 50 may indicate the memory region in any suitable fashion (e.g. base address and size, base and limit addresses, etc.). If the address is not in the relocation region, then the control circuit 48 selects the input address and the output of the address map 52 as the output of the translation/map circuit 32 through the output mux 54 (block 72).

On the other hand, if the address is in the relocation region and is a hit in the address relocation cache 46 (decision block 74), then the control circuit 48 selects the output of the address relocation cache 46 (the output address and corresponding destination identifier) as the output of the translation/map circuit 32 through the output mux 54 (block 76). If the address is in the relocation region and is a miss in the address relocation cache, then the control circuit 48 signals the miss to the table walk circuit 42 (block 78). The table walk circuit 42 may also be coupled to receive the input address, and may search the translation tables for a translation corresponding to the input address. The control circuit 48 may wait for a signal from the table walk circuit 42 indicating that the table walk circuit 42 is updating the address relocation cache 46 (decision block 80). During the update, the output address and corresponding destination identifier may be available at the output of the address relocation cache 46, and the control circuit 48 may select the output of the address relocation cache 46 as the output of the translation/map circuit 32 (block 76). Alternatively, rather than selecting the output of the address relocation cache 45, a bypass path may be provided for selecting. In such an alternative, the address relocation cache 46 need not provide the update data at its output during the update.

It is noted that, while the illustrated embodiment has the control circuit 48 waiting for the update to the address relocation cache 46 in the event of a miss, other transaction addresses may be allowed to continue processing through the translation/map circuit 32 while the table walk is being performed. In such an embodiment, the control circuit 48 may respond to the other addresses in a similar fashion to that shown in FIG. 4 while waiting for the update to the address relocation cache 76.

Figure 5:
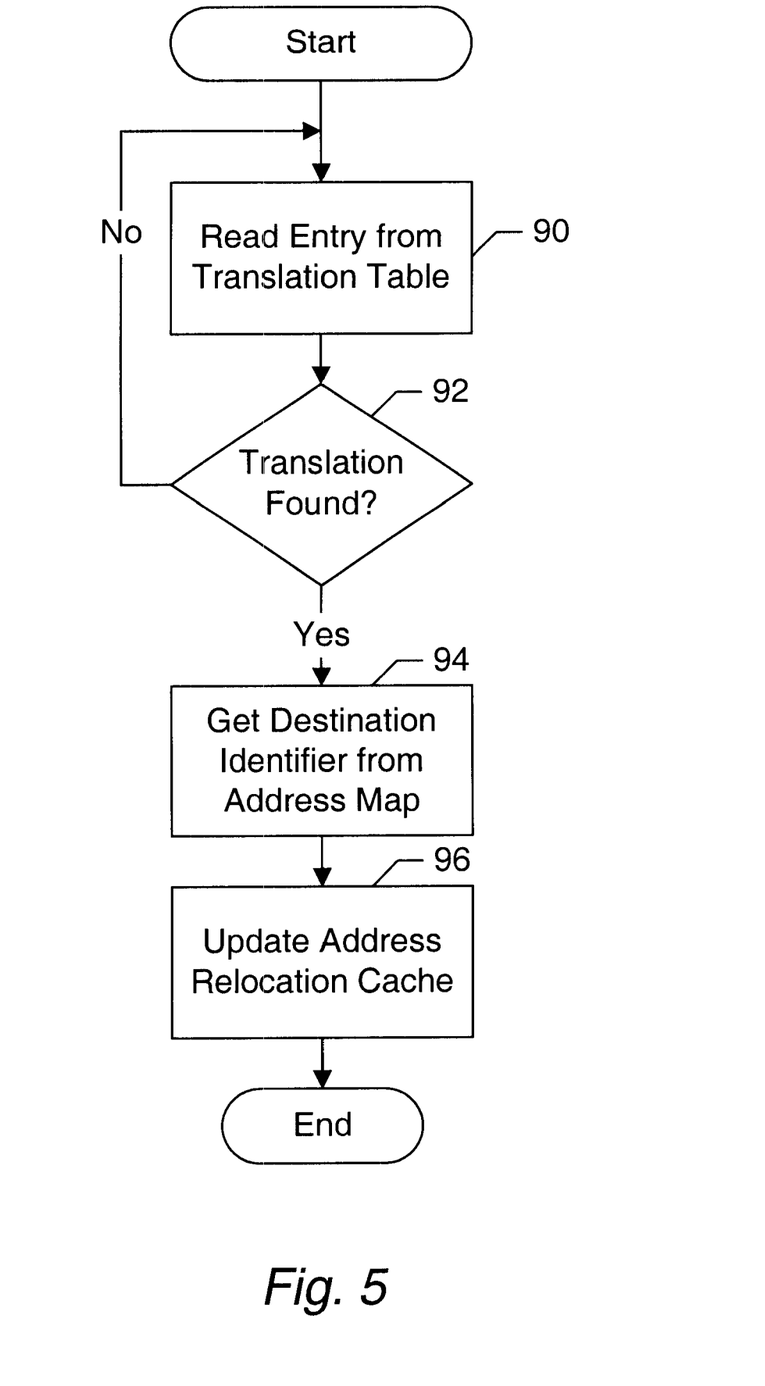
FIG. 5 is a flowchart illustrating operation of one embodiment of a table walk circuit shown in FIG. 3.

Turning next to FIG. 5, a flowchart is shown illustrating operation of one embodiment of the table walk circuit 42. Other embodiments are possible and contemplated. While the blocks shown in FIG. 5 are illustrated in a particular order for ease of understanding, any suitable order may be used. Furthermore, the blocks may be implemented in parallel in combinatorial logic circuitry within the table walk circuit 42. Still further, various blocks may occur in different clock cycles or the same clock cycle, as desired.

Generally, the table walk circuit 42 is configured to search through one or more entries in the translation tables to locate the translation corresponding to the input address. This operation is illustrated by block 90 and decision block 92 in FIG. 5. The manner in which the entries are read is dependent on the structure of the translation tables and the employed translation mechanism, in general. Typically, the table base address and the input address are combined in some fashion to generate the address of the first entry to be read. For example, the table base address may be the base address of a first translation table and a portion of the input address may be an index into the first table. The indexed entry may be a pointer to a base address of a second table, and a second portion of the input address may be used as in index into the second table, which may in turn contain a pointer to a third table, etc. This hierarchy of page tables may be repeated until each portion of the input address which is not an offset in the page has been used as an index. The hierarchical method is similar to the x86 virtual to physical address translation mechanism. As another example, the table base address and the input address may be hashed together to form a first address. The first address may be a pointer to a set of translation table entries, each of which may be examined to determine if a translation corresponding to the input address is stored therein. If not, then a second hash function may be applied to select a second set of translation table entries. This example is similar to the Power PC virtual to physical translation mechanism. In yet another example, the table base address and the input address may be hashed to form an address which is the head pointer of a linked list of translation entries. The table walk circuit 42 may traverse the linked list searching for a translation entry having a translation corresponding to the input address. Any translation mechanism (and corresponding set of translation tables) may be used in various embodiments.

Generally, each address generated by the table walk circuit 42 for reading an entry or entries of a translation table may be passed through the address map 52 to obtain the corresponding destination identifier. For example, in the embodiment of FIG. 3, the addresses may be supplied through the input mux 40 to the address map 52, and the corresponding destination identifier and input address may be selected through the output mux 54 as the output of the translation/map circuit 32. The read transaction may be routed to the destination (typically a memory controller 16A–16D coupled to a memory 14A–14D storing data corresponding to the address of the read transaction), and the corresponding data may be routed back to the table walk circuit 42 for processing.

Once a translation has been located, the table walk circuit may obtain the destination identifier corresponding to the translated address (the output address corresponding to the input address which missed that address relocation cache 46) from the address map 52 (block 94). In the embodiment illustrated in FIG. 3, for example, the table walk circuit 42 may supply the translated address through the input mux 40 to the address map 52 and may receive the corresponding destination identifier therefrom. Any mechanism for obtaining the destination identifier may be used. The table walk circuit 42 may update the address relocation table 46 with the input address, the output address, and the destination identifier (block 96). A separate write port may be provided on the address relocation cache 46 for updating, or the table walk circuit may supply the input address through the input mux 40 to the address relocation cache 46. It is noted that blocks 94 and 96 may be performed concurrently. It is noted that the destination identifier output by the address map 52 may be provided directly to the address relocation cache 46 for storage. In such an embodiment, the table walk circuit 42 may select the output address through the input mux 40 and may update the address relocation cache 46 with the input address and output address. The output address may cause the address map 52 to output the corresponding destination identifier, which may be stored in the entry of the address relocation cache 46 allocated to the input address and output address. The table walk circuit 42 may signal the control circuit 48 that the update is occurring. The control circuit 48 may select the entry in the address relocation cache 46 to be replaced by the newly accessed data using any suitable replacement mechanism (e.g. least recently used, modified least recently used, random, first-in first-out, etc.).

Turning now to FIG. 6, a block diagram of one embodiment of a destination identifier 100 is shown. Other embodiments are possible and contemplated. In the embodiment of FIG. 6, the destination identifier 100 includes a node number 102, a unit number 104, a memory or I/O indication 106, an I/O memory management unit (MMU) indication 108, a port identifier 110, and paging information 112.

The node number 102 may be a value which identifies one of the nodes in the system (e.g. one of the processing nodes 12A–12D in the embodiment of FIG. 1). The unit number 104 may be a value identifying a particular device within a node (e.g. the CPU 30, the AGP interface 34, the memory controller 16A, a host bridge to an I/O device, etc.). The memory or I/O indication 106 indicates whether the address identifies a memory location (e.g. in one of memories 14A–14D in the embodiment of FIG. 1) or is a memory mapped I/O address which addresses an I/O device. The I/O MMU indication 108 is used to indicate if the address is remapped using the I/O MMU. The I/O MMU may be used in systems having a physical address size greater than the physical address supported on certain existing I/O devices and/or buses. For example, many PCI and AGP devices support a maximum 32 bit address. However, an embodiment of the system 10 may support, for example, 40 bits of address. In such an embodiment, the PCI and AGP devices would not be able to transfer data (e.g. direct memory access (DMA)) to addresses in which any of bits 39:32 of the 40 bit address are non-zero. With the I/O MMU addresses can be mapped through an I/O translation mechanism from addresses in which bits 39:32 are zero to any address (e.g. addresses in which bits 39:32 are non-zero). The port identifier 110 may identify an output port from the node 12A on which the transaction is to be routed (e.g. one of interfaces 18A–18C). Finally, the paging information 112 may indicate other attributes for memory addresses on a page granularity (e.g. 4 kilobytes). For example, one or more of the following may be indicated in the paging information: whether or not the page is coherent, a priority level for accesses (providing for reordering of accesses to different pages in the memory controller), the memory type, etc. Alternatively, the above information may be managed on a block granularity, or any other desired granularity. Any attributes may be supplied, as desired.

While the embodiment of FIG. 6 includes several values in the destination identifier (some of which may not even be included in destination identifier in the address map 52), other embodiments may include any combination of the values, or any combination of the values and other desired values. Generally, any destination information may be included. Furthermore, a destination identifier may be any one of the values shown in FIG. 6, as desired, or any other single value.

Figure 7:
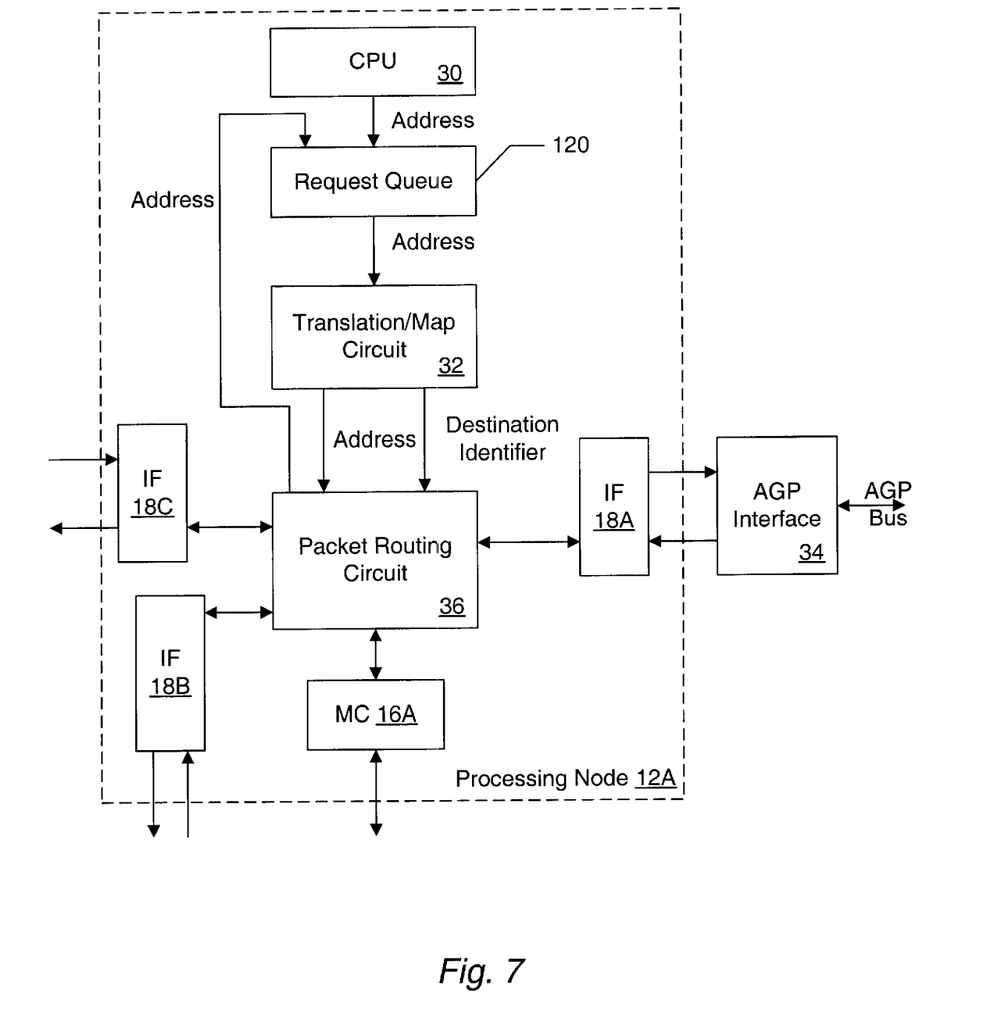
FIG. 7 is a block diagram of another embodiment of the processing node and an external advanced graphics port (AGP) interface.

Turning next to FIG. 7, a block diagram of a second embodiment of the processing node 12A and an external AGP interface 34 is shown. Other processing nodes may be configured similarly. Other embodiments are possible and contemplated. In the embodiment of FIG. 7, the processing node 12A includes the CPU 30, the translation/map circuit 32, the packet routing circuit 36, the memory controller 16A, and the interfaces 18A–18C similar to the embodiment of FIG. 2. Additionally, the embodiment of FIG. 7 includes a request queue 120. As with the embodiment of FIG. 2, the packet routing circuit 36 is coupled to the interfaces 18A–18C (each of which may be coupled to respective unidirectional links in the present embodiment, as illustrated in FIG. 1) and the memory controller 16A (which may be coupled to the memory 14A as shown in FIG. 1). The packet routing circuit 36 may also be coupled to the AGP interface 34 and the CPU 30 for routing of packets destined for those elements, as desired. The AGP interface 34 is coupled to the AGP bus for communicating with an AGP device. In the embodiment of FIG. 7, the AGP interface 34 is coupled to the unidirectional links of the interface 18A and thus may transmit packets to the interface 18A and receive packets from the interface 18A. For example, the AGP interface 34 may be an I/O device similar to the I/O devices 20A–20B in FIG. 1. The packet routing circuit may be coupled to supply an address of a transaction to the request queue 120, which is also coupled to receive addresses of transactions from the CPU 30. The request queue 120 is configured to supply addresses to the translation map circuit 32, which is coupled to supply (possibly translated) addresses and destination identifiers to the packet routing circuit 36.

In the embodiment of FIG. 7, the packet routing circuit 36 routes addresses received from the interfaces 18A–18C which may require translation and/or destination identifier mapping to the request queue 120. For example, transactions sourced from I/O devices (e.g. AGP devices on the AGP bus) may require translation (if the address of the transaction is within the translation region indicated by the relocation region register 50) and destination identifier mapping. Other I/O devices may similar require translation (if the address of the transaction is within the translation region) and destination identifier mapping and thus may be used in place of the AGP interface 34 or in conjunction with the AGP interface 34, in other embodiments.

In one embodiment, the packet routing circuit 36 may include information identifying which of the interfaces 18A–18C are coupled to I/O devices (or other devices which may require translation and destination identifier mapping). For example, the packet routing circuit 36 may include or be coupled to a configuration register which may be programmed with a bit for each interface, indicating whether or not that interface is coupled to I/O devices. The packet routing circuit 36 may route addresses from packets received on interface identified as being coupled to I/O devices to the request queue 120 for possible translation and destination identifier mapping. Packets from other interfaces may be routed based on the destination identifier information.

In some embodiments, in addition to supplying the address of packets from the packet routing circuit 36 to the request queue 120 when addresses may require translation and/or destination identifier mapping, the packet routing circuit 36 may supply other information from the packet, or even the entire packet, to the request queue 120. Circuitry within the request queue 120 or coupled thereto (not shown in FIG. 7) may perform other processing on the packet, related to transmitting the packet from a noncoherent I/O domain into a coherent domain. Alternatively, such circuitry may be implemented in the interfaces 18A–18C or the packet routing circuit 36.

In another embodiment, the packet routing circuit 36 may include the relocation region register 50 (or a shadow register of the relocation region register) for comparing addresses from packets to determine if the packets require translation. The addresses of packets which require translation (and a destination identifier for the translated address) may be routed to the request queue 120 and other packets (having addresses that don't require translation and which have destination identifiers) may be routed based on the destination identifier already in those packets.

The request queue 120 may receive inputs from multiple sources and provide a single input to the translation/map circuit 32. Thus, an embodiment of the translation/map circuit 32 similar to FIG. 3 could be used with the mux 40 coupled to receive the address from the request queue 120 and the address from the table walk circuit 42, and the table walk circuit 42 may select between the two addresses. In yet another alternative, the table walk circuit 42 may provide addresses to the request queue 120 (which may be prioritized higher than other addresses in the request queue 120, if desired), and the mux 40 may be eliminated.

While the request queue 120 provides a single input to the translation/map circuit 32, other embodiments may provide multiple inputs to allow multiple addresses to progress in parallel. Such embodiments may be used, e.g., if the translation/map circuit 32 is a multi-ported circuit.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a memory including a plurality of entries, each of the plurality of entries configured to store:
   (i) at least a portion of an input address and at least a portion of a corresponding output address to which the input address translates; and
   (ii) a destination identifier indicative of a destination corresponding to the output address; and
   wherein the memory is coupled to receive at least a portion of a first input address, and wherein the memory is configured to output at least a portion of a first output address and a first destination identifier from a first entry of the plurality of entries responsive to detecting that the first input address hits in the first entry.

2. The apparatus as recited in claim 1 further comprising a control circuit coupled to receive at least a portion of the first input address and configured to detect whether or not the first input address is within a memory region for which addresses are translated, and wherein the control circuit is configured to select the first output address and the first destination identifier for output from the apparatus in response to detecting that the first input address is within the memory region.

3. The apparatus as recited in claim 2 further comprising a table walk circuit coupled to the control circuit, wherein the control circuit is configured to signal the table walk circuit in response to a first input address which misses in the memory and is within the memory region, wherein the table walk circuit is configured to read a translation table to locate a translation of the first input address in response to the control circuit signalling.

4. The apparatus as recited in claim 2 further comprising an address map coupled to receive at least a portion of the first input address, the address map configured to output a second destination identifier corresponding to the first input address, and wherein the control circuit is configured to select the first input address and the second destination identifier for output from the apparatus in response to the first input address being outside the memory region.

5. The apparatus as recited in claim 4 wherein the address map is coupled in parallel with the memory.

6. The apparatus as recited in claim 1 further comprising a central processing unit (CPU), wherein the CPU is a source of the first input address.

7. The apparatus as recited in claim 1 further comprising an advanced graphics port (AGP) interface, wherein the AGP interface is a source of the first input address.

8. The apparatus as recited in claim 1 wherein the destination identifier comprises a node number identifying a first node of a plurality of nodes in a system including the apparatus.

9. The apparatus as recited in claim 8 wherein the destination identifier further comprises a second number identifying a device within the first node.

10. The apparatus as recited in claim 1 wherein the destination identifier comprises an indication of whether or not the output address is a memory address or an input/output (I/O) address.

11. The apparatus as recited in claim 1 further comprising a plurality of output ports, wherein the destination identifier comprises a port number indicating one of the plurality of output ports for routing a communication corresponding to the output address.

12. The apparatus as recited in claim 1 wherein the first destination identifier is not used in detecting that the first input address hits in the first entry.

13. A method comprising:
receiving at least a portion of an input address in a memory; and
outputting at least a portion of an output address from the memory, the output address being a translation of the input address; and
outputting a first destination identifier from the memory, the first destination identifier indicative of a destination for a transaction to the output address, wherein the destination is within a system that includes the memory.

14. The method as recited in claim 13 further comprising:
detecting whether or not the input address is within a memory region for which addresses are translated;
selecting the output address and the first destination identifier in response to detecting that the input address is within the memory region; and
selecting the input address and a second destination identifier from an address map in response to detecting that the input address is outside of the memory region.

15. The method as recited in claim 14 further comprising outputting the second destination identifier from the address map in parallel with the outputting the output address and the outputting the first destination identifier.

16. The method as recited in claim 13 wherein the first destination identifier comprises a node number identifying a first node of a plurality of nodes.

17. The method as recited in claim 16 wherein the first destination identifier further comprises a second number identifying a device within the first node.

18. The method as recited in claim 13 wherein the first destination identifier comprises an indication of whether or not the output address is a memory address or an input/output (I/O) address.

19. The method as recited in claim 13 wherein the first destination identifier comprises a port number indicating one of a plurality of output ports for routing a communication corresponding to the output address.

20. An apparatus comprising:
a table walk circuit configured to locate a translation of an input address to an output address;
an address map coupled to the table walk circuit, wherein the table walk circuit is configured to provide the output address to the address map, and wherein the address map is configured to output a destination identifier in response thereto, the destination identifier indicative of a destination for a transaction to the output address, wherein the destination is within a system that includes the apparatus; and
a memory coupled to the table walk circuit, the memory configured to store at least a portion of the input address, at least a portion of the output address, and the destination identifier.

21. The apparatus as recited in claim 20 wherein the destination identifier comprises a node number identifying a first node of a plurality of nodes in a system including the apparatus.

22. The apparatus as recited in claim 21 wherein the destination identifier further comprises a second number identifying a device within the first node.

23. An apparatus comprising:
a table walk circuit configured to locate a translation of an input address to an output address;
an address map coupled to the table walk circuit, wherein the table walk circuit is configured to provide the output address to the address map, and wherein the address map is configured to output a destination identifier in response thereto, the destination identifier indicative of a destination for a transaction to the output address, wherein the destination is within a system that includes the apparatus; and
a memory coupled to the table walk circuit, the memory configured to store at least a portion of the input address, at least a portion of the output address, and the destination identifier, and wherein the memory is coupled to receive at least a portion of a first address, and wherein the memory is configured to output at least a portion of a second address and a first destination identifier from a first entry of a plurality of entries in the memory, the first address hitting in the first entry, wherein the second address is the output address to which the first address translates.

24. The apparatus as recited in claim 23 further comprising a control circuit coupled to receive at least a portion of the first address and configured to detect whether or not the first address is within a memory region for which addresses are translated, and wherein the control circuit is configured to select the second address and the first destination identifier for output from the apparatus in response to detecting that the first address is within the memory region.

25. The apparatus as recited in claim 23 further comprising a central processing unit (CPU), wherein the CPU is a source of the first address.

26. The apparatus as recited in claim 23 further comprising an advanced graphics port (AGP) interface, wherein the AGP interface is a source of the first address.

27. The apparatus as recited in claim 23 wherein the address map is coupled to be accessed by the first address in parallel with the memory.

28. The apparatus as recited in claim 23 wherein the destination identifier comprises an indication of whether or not the second address is a memory address or an input/output (I/O) address.

29. The apparatus as recited in claim 23 further comprising a plurality of output ports, wherein the destination identifier comprises a port number indicating one of the plurality of output ports for routing a communication corresponding to the second address.

* * * * *

UNITED STATES PATENT AND TRADEMARK OFFICE
CERTIFICATE OF CORRECTION

PATENT NO. : 6,665,788 B1
DATED : December 16, 2003
INVENTOR(S) : Hughes, William Alexander It is certified that error appears in the above-identified patent and that said Letters Patent is hereby corrected as shown below:

<u>Title page,</u>
Item [*] Notice, should read -- Subject to any disclaimer, the term of this patent is extended or adjusted under 35 U.S.C. 154 (b) by 23 days. --

Signed and Sealed this

Twenty-eighth Day of June, 2005

JON W. DUDAS
*Director of the United States Patent and Trademark Office*